United States Patent [19]
Zocca

[11] Patent Number: 5,992,740
[45] Date of Patent: Nov. 30, 1999

[54] METHOD AND APPARATUS FOR THE ACQUISITION OF INFORMATION ASSIGNED TO OBJECTS

[75] Inventor: Rinaldo Zocca, Bologna, Italy

[73] Assignee: Datalogic S.p.A., Bologna, Italy

[21] Appl. No.: 08/796,748

[22] Filed: Feb. 6, 1997

[30] Foreign Application Priority Data

Feb. 10, 1996 [DE] Germany .............................. 196 04 909

[51] Int. Cl.⁶ .................................................. G06K 7/10
[52] U.S. Cl. ........................................ 235/436; 235/462.25
[58] Field of Search .................................. 235/470, 454, 235/462, 469, 472, 436, 462.25–462.3

[56] References Cited

U.S. PATENT DOCUMENTS

| | | | |
|---|---|---|---|
| 5,345,089 | 9/1994 | Lorenzo et al. | 250/566 |
| 5,548,110 | 8/1996 | Storch et al. | 235/472 |
| 5,569,901 | 10/1996 | Bridgelall et al. | 235/470 |

FOREIGN PATENT DOCUMENTS

| | | |
|---|---|---|
| 0085495 | 8/1983 | European Pat. Off. . |
| 0574024 | 12/1993 | European Pat. Off. . |
| 59-099578 | 6/1984 | Japan . |

*Primary Examiner*—Thien Minh Le
*Attorney, Agent, or Firm*—Sughrue, Mion, Zinn, Macpeak & Seas, PLLC

[57] ABSTRACT

A method and an apparatus for the acquisition of information assigned to objects, in particular of a bar code, are proposed and are distinguished by the fact that an optimum compromise between performance and reliability of the read operation is set and is kept constant over time.

11 Claims, 1 Drawing Sheet

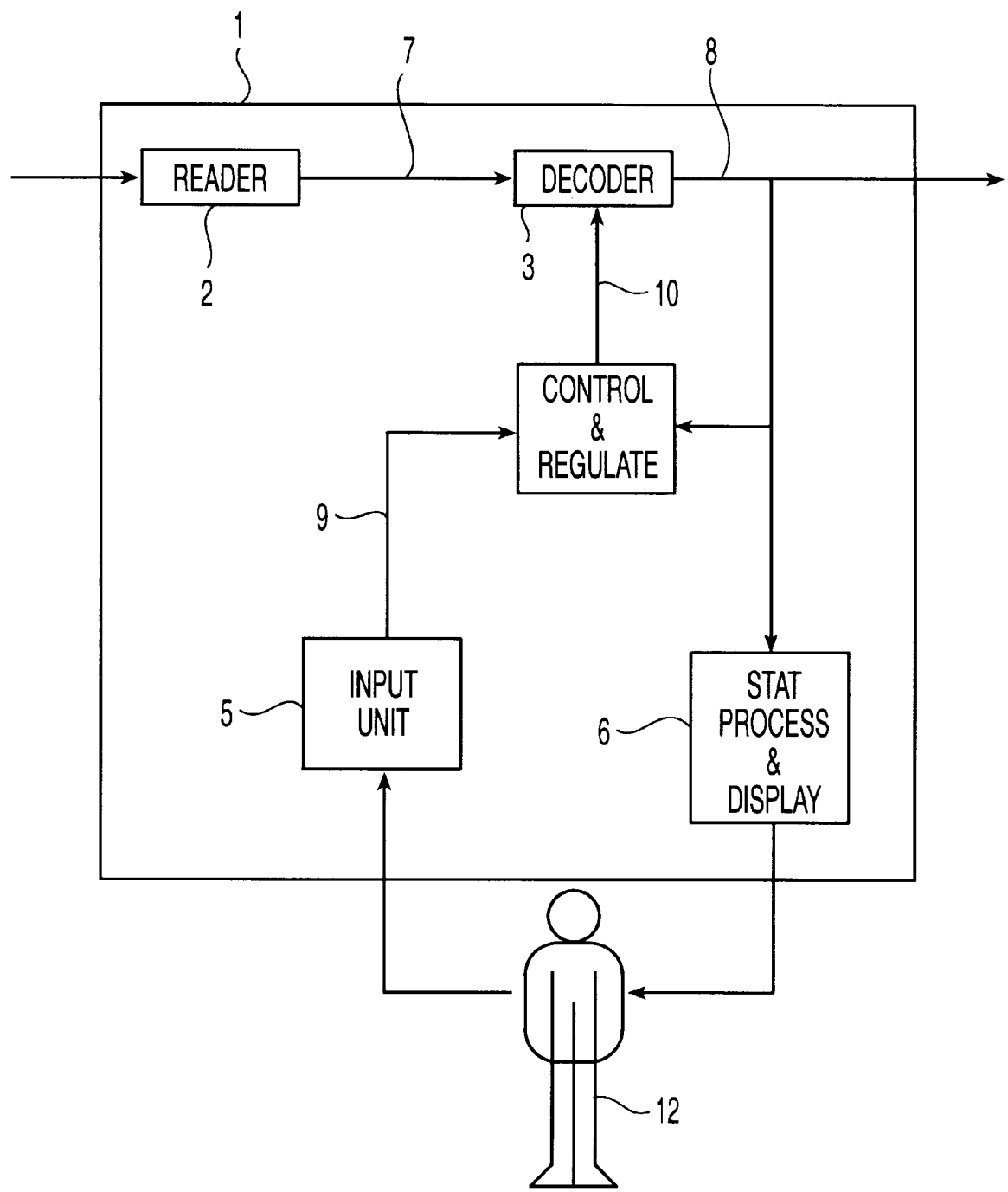

METHOD AND APPARATUS FOR THE ACQUISITION OF INFORMATION ASSIGNED TO OBJECTS

SUMMARY OF THE INVENTION

The invention relates to a method and an apparatus for the acquisition of information assigned to objects, in particular of bar codes.

Methods and apparatuses for the acquisition of information assigned to objects, for example of bar codes, are known. The problem arising in the application of such methods and when using such apparatuses is that of finding a compromise between reliability and performance in the read operation. "Performance" is understood to mean the capability of obtaining the highest possible number of correct read results. The performance of the read operation can be expressed as a percentage of the correct results compared with the total number of read attempts. The term "reliability" is understood to mean the capability of obtaining as few false read results as possible. The reliability of the read operation can be expressed as making up to a hundred the percentage of the false results compared with the total number of read attempts.

The following relation exists between reliability and performance: the higher the performance, the lower the reliability, and vice versa.

If a method having a high degree of reliability and a low degree of performance is employed under good operating conditions, there will be no false results, but the percentage of correct read results will be far below the percentage which could be achieved in spite of retaining maximum reliability. On the other hand, if a method having a low degree of reliability and a high degree of performance is used under difficult operating conditions, there will be many false results, whereas it would be preferable, however, to reduce the percentage of correct read results in order to keep the reliability within acceptable values.

In addition, the operating conditions can change with time, as a result of which the choice made at a particular moment will turn out to be unsuitable at a later point in time, when the operating conditions have changed.

Finally, the reliability value which is viewed as acceptable depends on the application for which the bar code reader is employed. In some cases, namely, absolute reliability is necessary (for example in the supervision of medicaments), since a false reading could have serious consequences; in other applications, however, a certain number of errors are acceptable when maintaining a method having a high degree of performance, since possible errors in these cases are relatively undeleterious or can be detected by a more highly developed monitoring system.

The object of the invention is to provide a method and an apparatus for the acquisition of information assigned to objects, which method and apparatus are designed in such a way that they achieve an optimum compromise between performance and reliability of the read operation and keep it constant over the course of time.

A method having the features cited in Claim 1 and an apparatus having the features cited in Claim 10 are proposed in order to achieve this object.

The method and the apparatus of the type described below can be used in general terms for the acquisition of information assigned to objects. As a very general example, it is assumed below that the information is composed of bar codes. The information is acquired with the aid of a suitable reading device, for example a video camera. However, there is nothing to prevent the use of a traditional laser for bar codes. The signals emitted by the reading apparatus are decoded and analysed. In general, a distinction is drawn between three different cases, the information not having been decoded in the first case: this is referred to as a NO READ case. Provided that the information has successfully been decoded in some way, a distinction is drawn between two further cases, that is to say firstly the case when the information has been correctly decoded (READ case/good read) and the case when the information has not been correctly decoded (misread).

BRIEF DESCRIPTION OF THE DRAWING

The apparatus is illustrated diagrammatically in the drawing, where only some of the elements or assemblies which form an apparatus for the acquisition of information assigned to objects are illustrated, namely those which are of interest for the description.

DETAILED DESCRIPTION OF THE INVENTION

A reading unit 2 converts the information contained in the scanned object into a signal 7, in particular into an electrical signal, which can be decoded by a decoding apparatus 3. The result 8 of the decoding operation or of the decoding method is transmitted both to a control and regulating apparatus 4 and to a unit for statistical processing and display 6. The latter carries out a statistical analysis of the results of the decoding operation and displays them to an operator 12 in a suitable manner. Said operator has the option of supplying the regulating apparatus with information 9 concerning the way in which the said regulating apparatus is to regulate the system, the operator doing this by actuating the input unit 5. By combining the possible information from the operator and the results from the decoding operation, the regulating apparatus can change the behaviour of the decoding apparatus in that it acts via a line 10 on the control and supervisory input of the decoding apparatus, with the result that the entire method obtains a higher performance or higher reliability.

The method of operation of the apparatus illustrated in FIG. 1 and the method for the acquisition of information will be explained in more detail below:

The signal acquired by the reading unit 2 has errors and distortion, the extent of which depends on the conditions under which the apparatus is operating. The decoding method used can be changed in such a way that it can be given a higher reliability or a higher performance by actuating the supervisory, input of the decoding apparatus. As already stated, the result of the decoding operation can be classified into two different cases: NO READ or READ. In the READ case, two different possibilities emerge in reality: CORRECT READ or FALSE READ.

Since there are many different code symbols and different decoding methods are known for each symbology, the intention in the following text is to demonstrate how it is possible to convert any desired known method into an adaptive method.

To this end, use is made of the fact that the number of NO READ cases is proportional to the reliability and inversely proportional to the performance, that is to say, when the system has few NO READ cases, the performance, but also the risk of errors, is lower.

It is therefore sufficient to determine those points in the known method where there is a decision concerning the validity or invalidity of the read operation that is carried out, and to change the criterion according to which these decisions are made, so that it is possible to change the probability of obtaining a READ result rather than a NO READ result.

The following known method for decoding the symbol CODE39 may be cited here as an example:

The following steps are executed for each character:

a) Measurement of the overall length of the character S.

b) Calculation of the threshold T=S/8.

c) Each element is compared with the threshold T. If it is larger than T, the element is classified as wide, otherwise as narrow.

d) Determine the character to which the sequence of wide and narrow elements correspond.

This method is known to be characterized by good performance but very poor reliability.

P is now intended to be a parameter for supervising the method procedure, where P=0 is assumed for maximum performance and P=1 is assumed for maximum reliability. The known method described above can be altered in a simple manner as follows:

The following steps are executed for each character:

a) Measurement of the overall length of the character S.

b) Calculation of the thresholds T1=S/8−(S*P) /4 and T2=S/8+(S*F) /4 c) Each element is compared with the thresholds T1 and T2. If the element is larger than T2, the element is to be classified as wide. If the element is smaller than T1, the element is to be classified as narrow; the NO READ state is assumed otherwise.

d) Determine the character to which the sequence of wide and narrow elements corresponds.

It will be found that at P=0 the altered method corresponds exactly to the known method, which has a very high performance but is not very reliable. With P>0, the reliability rises more and more, until it reaches a maximum P=1.

Analogous techniques can be employed in a simple manner in any desired decoding method.

In order to provide an operator with the option of checking whether the method of the apparatus is satisfactory, the results of the decoding operation are processed and displayed to the operator in the form of statistics; the operator can assess the percentage of NO READ cases and possible FALSE READ cases and, via a suitable input unit, provide the regulating apparatus with instructions for altering the behaviour of the system in such a way that it obtains a higher performance or a higher reliability, depending on the requirement.

The setting of the decoding apparatus 3 can take place during the so-called learning phase, which takes place independently of the actual use of the apparatus. However, it is also possible to influence the decoding phase while the apparatus for the acquisition of information is in operation.

During normal operation of the apparatus, in the absence of the operator the regulating apparatus ensures that the behaviour of the decoding apparatus corresponds to the requirements entered by the operator, even in the event of changes in the operating conditions.

A method in which the presence of an operator is not required is also preferred. In this case, the regulating apparatus is able to carry out the setting automatically, as follows:

Since bar code decoding methods for the most part have known features, it is possible to preset the percentage of READ and NO READ cases which the regulating apparatus has to achieve to an optimum level, in order that the highest possible degree of performance is guaranteed in standard operating conditions, but at the same time it is also ensured that false reading does not occur. This optimum level can be set in advance not only according to the type of code, but also as a function of the length and the presence or absence of check characters which are integrated into the code.

Since this information can be found from the result of the decoding operation, the regulating apparatus is able to select the optimum level from the levels set in advance and act on the input of the decoding apparatus to keep the said optimum level stable over the course of time. This method is particularly simple since it does not require any intervention by the operator and ensures that a performance maximum without any errors is achieved when the apparatus is used under the defined standard operating conditions.

Finally, a method is also preferred which enables automatic regulation of the apparatus to be carried out even when the features of the decoding method are not known in advance or when the apparatus is used under operating conditions other than the standard conditions.

This method requires at least two decoding operations for the data supplied by the reading unit. In this case, the supervisory input of the decoding apparatus is in reality composed of two information items which represent the parameter to be used during the first decoding operation and the parameter to be used during the second decoding operation. These two parameters are created such that the second decoding operation is more reliable than the first. The two results are transmitted to the regulating apparatus, which operates as follows:

If a READ case occurs in both decoding operations, it is possible to increase the reliability of the system. The supervisory input of the decoding apparatus is therefore changed in such a way that the decoding operations have a higher reliability.

If a NO READ case occurs in both decoding operations, it is possible to increase the performance. The supervisory input of the decoding apparatus is therefore changed in such a way that the decoding operation obtains a higher performance.

If correct reading occurs in the decoding operation having a higher performance and no reading occurs in the decoding operation having a higher reliability, then the supervision of the system has been set to the optimum point and is therefore not changed.

The two decoding operations can be carried out simultaneously or one directly after the other.

During operation, the apparatus may be exposed to different ambient conditions: the lighting conditions, for example, may change when reading the information on the articles, and also the state or the quality of the information which is applied, for example, by means of self-adhesive labels. During application, the labels may be stretched or crease and therefore lead to poor reading of the information. It is also possible that the information, or bar codes, printed onto the labels is not very legible, that the printing is erroneous or the objects or their labels have been exposed to mechanical stresses or are soiled.

It is ensured in all these cases that the method is carried out in an optimum manner between maximum performance and maximum reliability, and that the settings also remain valid during operation of the apparatus. This optimum operating condition can be set by the operator or automatically without requiring any intervention by the operator.

With regard to the illustrations in FIG. 1, it must also be added that the method and the apparatus can in general be produced by means of hardware and software, but also by a combination of both. The apparatuses (reading apparatus, decoding apparatus, apparatus for statistical processing and visualization, input apparatus, regulating apparatus) illustrated in the figure, and also the circuits which connect these apparatuses, can therefore be produced entirely or partially by means of software.

What is claimed is:

1. Method for the acquisition of information assigned to objects by an optical code, characterized in that an optimum compromise between the performance and reliability of the read operation is set and is kept constant over time.

2. Method according to claim 1, characterized in that a reading unit (2) converts the information contained in the scanned object into a signal (7) which can be decoded by a decoding apparatus (3), in that the result (8) of the decoding process is transmitted to a regulating apparatus (4) which can change the behaviour of the decoding apparatus in that it acts on the supervisory input of the decoding device, thereby imparting a higher performance or a higher reliability to the entire method.

3. Method according to claim 2, characterized by a statistical and visual evaluation device (6) and an input device (5), by means of which devices an operator (12) can check and change the behaviour of the apparatus.

4. Method according to claim 2, characterized in that the decoding method can be changed, as a function of the input of a control signal of the decoding device (3), so that it obtains a higher reliability and a higher performance, and in that a signal is passed to the regulating apparatus, as a function of the occurrence of READ and NO READ cases, for the purpose of setting the decoding device in such a way that it obtains a higher reliability and a higher performance.

5. Method according to claim 2, characterized in that the decoding device can be set during a learning phase, and in that the regulating apparatus keeps the behaviour of the decoding device constant during normal operation.

6. Method according to claim 2, characterized in that, in the event of an input of a supervisory control signal of the decoding device, the decoding method cannot be changed in such a way that it obtains a higher reliability and a higher performance, and in that the regulating apparatus automatically regulates the behaviour of the apparatus so as to retain the standard function with maximum performance and with a minimum number of reading errors.

7. Method according to claim 2, characterized in that the decoding method can be changed in such a way that it obtains a higher reliability and a higher performance, and in that the regulating apparatus automatically regulates the behaviour of the apparatus such that, during operation, the latter always finds the best compromise between performance and reliability.

8. Method according to claim 2, characterized in that the decoding method can be changed with the aid of one or more parameters.

9. Method according to claim 2, characterized in that the decoding method can be changed in order to supervise the percentage proportion of READ and NO READ cases with the aid of one or more parameters.

10. Apparatus for the acquisition of information assigned to objects by an optical code for carrying out a method according to claim 2, characterized in that at least one of the assemblies of the apparatus can be realised with the aid of software.

11. Method for the acquisition of information assigned to objects, in particular optical codes, wherein a reading unit (2) converts the information contained in the scanned object into a signal (7) which can be decoded by a decoding apparatus (3), characterized in that the result of the decoding process is transmitted to a regulating apparatus (4) which can change the behavior of the decoding apparatus in that it acts on its supervisory input thereby setting an optimum compromise between the performance and the reliability of the read operation, said optimum compromise being kept constant over time.

* * * * *